(12) United States Patent
Waldo et al.

(10) Patent No.: US 8,788,127 B1
(45) Date of Patent: Jul. 22, 2014

(54) PRECISION AIRDROP TERMINAL SEEKER

(75) Inventors: Dale F. Waldo, Chesterfield, MO (US); David Ray Riley, Chesterfield, MO (US); Thomas Lyman Weaver, Webster Groves, MO (US)

(73) Assignee: The Boeing Company, Chicago, IL (US)

( * ) Notice: Subject to any disclaimer, the term of this patent is extended or adjusted under 35 U.S.C. 154(b) by 477 days.

(21) Appl. No.: 13/221,468

(22) Filed: Aug. 30, 2011

(51) Int. Cl.
*B64D 1/02* (2006.01)

(52) U.S. Cl.
CPC ........................................ *B64D 1/02* (2013.01)
USPC ................. 701/16; 701/4; 701/500; 342/385; 244/137.3

(58) Field of Classification Search
USPC ............................................................ 701/17
See application file for complete search history.

(56) References Cited

U.S. PATENT DOCUMENTS

| | | | | |
|---|---|---|---|---|
| 3,829,047 | A * | 8/1974 | Gonsalves | 244/3.16 |
| 4,086,841 | A * | 5/1978 | MacDonald | 89/1.56 |
| 5,137,193 | A * | 8/1992 | McDonald | 244/137.1 |
| 6,056,237 | A | 5/2000 | Woodland | |
| 6,889,123 | B2 | 5/2005 | Wittenberg | |
| 7,059,570 | B2 | 6/2006 | Strong | |
| 2010/0065288 | A1 | 3/2010 | Akcasu | |
| 2012/0104151 | A1 | 5/2012 | McCann | |
| 2013/0048787 | A1 | 2/2013 | Riley et al. | |
| 2013/0062457 | A1 * | 3/2013 | Deakin | 244/25 |

OTHER PUBLICATIONS

U.S. Notice of Allowance dated Apr. 29, 2013 in U.S. Appl. No. 13/471,903.
Noetscher et al., "Instrumentation for the Assessment of Parafoil Performance," 18th AIAA Aerodynamic Decelerator Systems Technology Conference and Seminar, AIAA 2005-1611.
Benney et al., "The Joint Precision Airdrop System Advanced Concept Technology Demonstration," 18th AIAA Aerodynamic Decelerator Systems Technoiogy Conference and Seminar, AIAA 2005-1601.
McGath et al., "Status of the Deveopment of an Autonomously Guided Precison Cago Aeral Delivery Sysem," 18th AIAA Aerodynamic Decelerator Systems Technology Conference and Seminar, AIAA 2005-1625.

(Continued)

*Primary Examiner* — Shelley Chen
(74) *Attorney, Agent, or Firm* — Hope Baldauff, LLC (57) ABSTRACT

A beacon receiving system on a pallet of a container cargo bundle is airdropped from a cargo airplane. The beacon receiving system comprises a sensor that detects during descent a beacon signal generated from a beacon placed at the target drop location. The sensor provides signals to a microcontroller that ascertains an angle at which the beacon signal is received. An inertial measurement unit provides signals indicating a tilt of the pallet during descent, which is used by the microcontroller to determine an offset angle of the received beacon signal. This information is used to steer the container cargo bundle during descent to achieve high precision in landing at the desired target drop location. The beacon signal may comprises a modulated light signal which can be distinguished by the sensor from other light sources.

20 Claims, 7 Drawing Sheets

(56) References Cited

OTHER PUBLICATIONS

Berland et al., "Development of a Low Cost 10,000 lb Capacit Ram-Air Parachue DRAGONFLY Program" AIAA Aerodynamic Decelerator Systems Technology Conference and Seminar, AIAA 2005-1626.

Carter et al., "Autonomous Guidance, Navigation, and Control a Large Parafoils," The Draper Technology Digest, vol. 10, 2006, pp. 14-25.

Gilles et al., "Flight Testing of a Low-Cost Precision Aerial Delivery System," 18th AIAA Aerodynamic Decelerator Systems Technology Conference and Seminar, AIAA 2005-1651.

McHugh et al., "Planning, Execution, and Results of the Precision Airdrop Technology Conference and Demonstration (2003)," 18th AIAA Aerodynamic Decelerator Systems Technology Conference and Seminar, AIAA 2005-1680.

Hattis et al., "Status of an on-board PC-based airdrop planner demonstration," AIAA Aerodynamic Decelerator Systems Technology Conference and Seminar, 16th, Boston, MA; May 21-24, 2001. pp. 1-11. 2001, Abstract Only.

Hattis et al., "An In-Flight Precision Airdrop Planning System," 23rd Army Science Conference, Dec. 2-5, 2002, Orlando, Florida.

Wright et al., "Precision Drop System," 18th AIAA Aerodynamic Decelerator Systems Technology Conference and Seminar, AIAA 2005-1644.

Kaesemeyer, "Testing of Guided Parafoil Cargo Delivery System," 18th AIAA Aerodynamic Decelerator Systems Technology Conference and Seminar; Munich; Germany; May 23-26, 2005, pp. 1-8, 2005.

* cited by examiner

PRECISION AIRDROP TERMINAL SEEKER

RELATED APPLICATIONS

This application is related to co-pending U.S. patent application Ser. No. 13/222,223, filed on Aug. 31, 2011, entitled "Steerable Container Delivery System."

BACKGROUND

Airdropping cargo is a common approach for providing materials or supplies (collectively called "cargo") to remote or hostile areas for supporting military troops. In military applications, airdropping cargo allows resupplying forward areas where ground transport of the cargo is not feasible. Airdropping cargo can also be used in non-military applications, such as delivery of emergency or relief supplies. Similarly, cargo aircraft can drop cargo in areas where ground transport is not readily possible, or timeliness does not allow for the delay associated with ground transportation of the cargo. While helicopters can also deliver supplies in remote areas, they are often limited as to the weight of the payload they can deliver and their delivery range. Further, they can be more susceptible to ground-to-air attacks.

Airdropping cargo has been facilitated by use of global positioning system ("GPS") technology allowing accurate indication of the aircraft's current position with respect to the intended drop location. GPS systems provide a specified degree of accuracy or precision depending on whether the systems are designed for military or civilian use. GPS systems for civilian applications are deliberately limited with respect to their precision. GPS systems for military applications allow enhanced precision, although these military GPS receivers are comparatively more expensive. GPS technology has limitations in that GPS signals can be jammed.

While airdrop techniques have been improved by using GPS, even a relatively minor error can result in the cargo being dropped in a location that is hundreds or thousands of feet from the desired location. Complicating the process is that in a hostile environment, it is usually safer for cargo aircraft to travel higher and faster when airdropping cargo. However, the accuracy of airdropped cargo is often facilitated by the aircraft traveling lower and slower, and this increases the risk of an attack on the aircraft.

A system that aids in identifying an airdrop location and that is not susceptible to GPS jamming, would facilitate accurate airdrops of cargo. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

The disclosure is generally directed to identification of an airdrop location that is marked by a beacon generating a beacon signal. A pallet that is attached to the cargo incorporates a beacon signal receiver able to detect the beacon signal during descent and provides information as to the relative angle of the beacon signal. This information can be used by a steering system to guide the cargo bundle to the drop location as identified by the beacon signal. When the main parachute is opened, the beacon receiver continues to track the beacon signal and provide information to the steering system for accurate placement of the cargo bundle.

In one embodiment disclosed herein, a system for targeting airdropped cargo delivery includes a sensor configured to be integrated with a pallet of a container delivery system bundle, wherein the sensor is able to detect a beacon signal of a specified electromagnetic wavelength spectrum directed in an upward direction from ground. The sensor is further configured to generate a first set of reference signals. The system also includes an inertial reference unit configured to be integrated into the pallet and generate a second set of reference signals. The system also includes a microcontroller configured to receive the first set of reference signals, receive the second set of reference signals, and use the first set of reference signals and the second set of reference signals to ascertain an offset angle of the beacon signal. The system also includes a beacon signal generator, configured to be placed at a drop location and generate the beacon signal of the specified electromagnetic wavelength spectrum.

In another embodiment disclosed herein, a system includes a sensor configured to be integrated with a pallet of a container delivery system bundle, wherein the sensor is able to detect a beacon signal of a specified electromagnetic wavelength spectrum directed in an upward direction from ground at an angle at least up to twelve degrees off of perpendicular, and the sensor is further configured to generate a first set of reference signals. The system also includes an inertial reference unit configured to be integrated into the pallet and configured to generate a second set of reference signals. The system also includes a microcontroller configured to receive the first set of reference signals and the second set of reference signals and ascertain an offset angle of the beacon signal, wherein the microcontroller is configured to generate data used to adjust steering of the container delivery system bundle during descent.

In another embodiment disclosed herein, a method for controlling the descent of an airdropped CDS bundle pallet includes receiving a beacon signal from a beacon sensor, ascertaining a frequency of the beacon signal, and determining the frequency of the beacon signal matches an expected frequency of the beacon signal. The method further includes determining a tilt of a CDS bundle pallet from an inertial measurement unit, determining an angle of the beacon signal as received by the beacon sensor, and determining an offset angle of the beacon signal.

The features, functions, and advantages that have been discussed can be achieved independently in various embodiments of the present disclosure or may be combined in yet other embodiments, further details of which can be seen with reference to the following description and drawings.

DETAILED DESCRIPTION

The following detailed description is generally directed to a container delivery system ("CDS"). A CDS generally refers to the various components associated with airdropping material or supplies ("cargo") from a cargo aircraft. Although the concepts and technologies disclosed herein are illustrated in the context of delivering supplies for a military application, the technology and concepts can be applied in non-military applications. For example, the technology disclosed herein can be readily adapted to airdropping emergency supplies or relief supplies in remote or drought-stricken areas.

The aircraft involved in an airdrop typically are cargo aircraft designed to airdrop cargo. The aircraft flies a planned route and releases one or more specially packaged cargo containers (termed a "CDS bundle" herein) at a defined location over the drop location. One of the components often found in a CDS is an on-board computing system that accurately determines the location of the aircraft based on GPS technology, factors in the aircraft's speed, direction, wind speeds, altitude of the aircraft, and various other factors to indicate the precise time when the CDS bundles should be released to land at the desired location.

In one embodiment, the CDS bundle comprises cargo that is strapped to a pallet. At the designated location, the cargo door on the aircraft is opened, and the pallet(s) are rolled out. Various techniques can be used to eject the CDS bundle from the cargo compartment of the cargo aircraft.

The aircraft may be travelling at 140-150 knots (160-172 mph), although high speed airdrops may occur at greater speeds—up to 250 knots. At these rates, each second of error can translate into significant deviation from the intended target. It is not uncommon for each second delay to translate into 75 yards (225 feet) on the ground. In a mountainous terrain, a horizontal distance of 75 yards can involve a significant distance from the intended location to retrieve the cargo.

The accuracy of an airdrop may be facilitated by the aircraft flying slower and at a lower altitude. In a hostile environment, however, the susceptibility of the aircraft to enemy fire increases with lower speed and lower altitude. Therefore, to reduce risk from enemy fire, it may be necessary to fly faster and at a higher altitude, which tends to decrease accuracy of the airdrop. It is not uncommon to airdrop CDS bundles from 20,000 to 25,000 feet.

Once the CDS bundle leaves the aircraft, the CDS bundle is in free fall. Typically, a drogue parachute or a streamer is deployed shortly after the CDS bundle leaves the aircraft. The main purpose of the drogue parachute is to stabilize the CDS bundle to an extent, as opposed to slowing its descent. The CDS bundle is rocked and buffeted by winds during its descent, but the drogue parachute at least ensures that the bottom of the CDS bundle is generally facing down. Otherwise, the entire CDS bundle would tumble end-over-end during free fall until the main parachute was deployed, and this would risk potential entanglement or malfunction of the main parachute.

The CDS bundle comprises several components, and may include an active steering mechanism controlled by a flight management controller to guide it to the drop location during descent. An example of an active steering mechanism is described in co-pending U.S. patent application entitled "Steerable Container Delivery System, assigned application Ser. No. 13/222,223 filed on Aug. 31, 2011, the contents of which are incorporated in its entirety. The flight management controller may incorporate GPS technology to provide navigation information that is used to steer the CDS bundle to the target drop location. However, it is possible to jam GPS signals from ground based jamming stations. Typically, the effectiveness of the jamming diminishes at higher altitudes. Thus, any flight management controller based solely on GPS navigation technology may be ineffective in guiding the pallet. If such guidance systems are rendered ineffective, then the drop location is likely to be inaccurate.

Once the main parachute is deployed, it can be more difficult to direct the CDS bundle. In many instances, it is after the main parachute is deployed that drop zone errors are likely to occur as it may be more difficult to steer the CDS bundle. Relying on an initial GPS fix and an internal Inertial Navigation System (INS) also has limitations in accuracy. The accuracy of civilian GPS type equipment is +/−100 feet. In various situations, this distance can significantly increase the difficulty in accessing the pallet. If military GPS equipment is used, the accuracy is improved, but the cost is then increased. It is expected that in many cases, the associated GPS equipment will not be reused or recovered. In some embodiments, the components may self-destruct to prevent re-purposing of the equipment by hostile forces. Consequently, it is preferable that any components used in the system are low cost.

Figure 1:
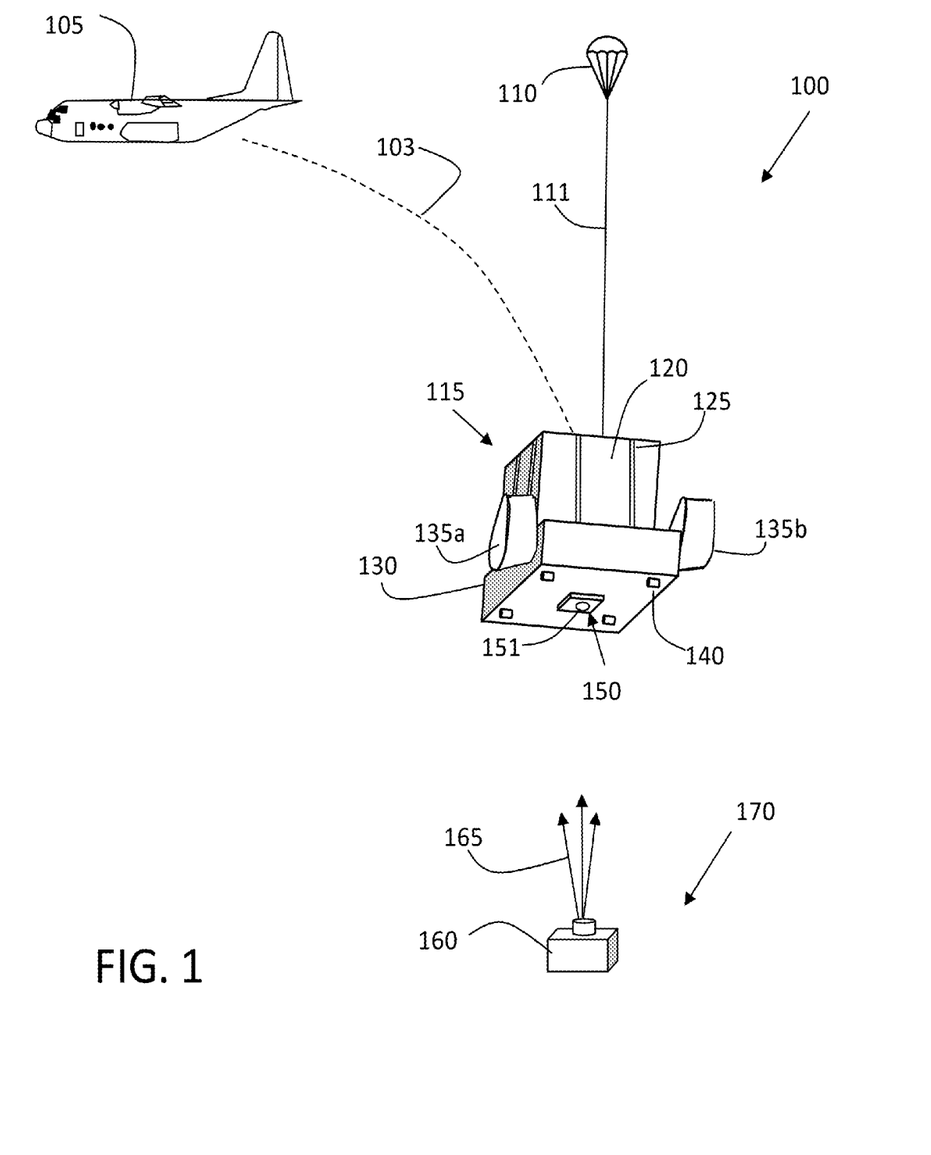
FIG. 1 illustrates one embodiment of an precision airdrop system according to one embodiment disclosed herein.

The context of the concepts and technologies presented herein for the precision airdrop system are illustrated in FIG. 1. FIG. 1 illustrates the cargo aircraft 105 airdropping the CDS bundle 115 at a certain location on the flight path. Various computer aided systems on the aircraft may assist the flight crew in determining the appropriate location to drop the cargo based on the aircraft's airspeed, altitude, etc. The CDS bundle is illustrated as falling according to the trajectory of line 103. Once the CDS bundle exits the aircraft, a drogue parachute 110 attached to a tether 111 is deployed. In other embodiments, a streamer can be used in lieu of a drogue parachute.

The CDS bundle is stabilized to an extent by the drogue parachute 110 that ensures that the CDS bundle 115 is not tumbling end-over-end during free-fall. Specifically, the drag caused by the drogue parachute will function to keep the CDS bundle properly oriented (i.e., with the bottom facing down). Nevertheless, the CDS bundle can be expected to rock or twist during free fall.

The CDS bundle comprises cargo 120 that is typically attached to the pallet 130 by a series of straps 125 or netting. The pallet 130 itself is illustrated as a single layer, but in some embodiments, the pallet may comprise several sub-layers (not shown). In one embodiment, the pallet 130 comprises as a skid sub-layer on the bottom, then a sub-layer (up to two feet thick) of crushable material, and finally a payload platform sub-layer. In some embodiments where the pallet has a steerable control system, various controls and components may be located within the payload platform sub-layer.

In the embodiment illustrated, the pallet 130 comprises four rollers 140 or wheels to allow the CDS bundle to roll off of the aircraft. In other embodiments, the rollers or wheels may be absent and rollers in the aircraft cargo bay may be relied upon to allow the CDS bundle to roll out of the aircraft.

Finally, a beacon receiving system ("BRS") 150 is integrated into the pallet. The beacon receiving system comprises a beacon sensor (or "sensor") 151 that faces downward and is able to detect a beacon signal 165 directed upwards. The beacon signals can be visible light and emanate from a beacon 160 positioned on the ground indicating the drop point 170 to the beacon receiving system 150. Although the illustration in FIG. 1 shows the beacon receiving system 150 attached to the underside of the pallet 130, in other embodiments the beacon receiving system may actually be inside one of the sub-layers of the pallet. However, the sensor 151 must have a line-of-sight view of the ground.

The CDS bundle 115 may incorporate various types of steerable mechanisms. In one embodiment, this can comprise two wing-like fin structures 135*a*, 135*b* (collectively referred to as 135) that can guide the delivery of the CDS bundle 115 during free-fall to the drop point 170. These fin structures 135 may be also controlled using GPS/INS devices in addition to the beacon receiver system 150. If so, the beacon receiving system 150 is typically relied upon to guide the CDS bundle 115 at lower altitudes when the beacon sensor 150 is able to locate the beacon signal 165. Once the beacon signal 165 is acquired, the beacon receiver system 150 provides navigation information used to direct the CDS bundle 115 to the drop point 170 with greater accuracy compared to using non-military type GPS receivers to guide the CDS bundle 115. Further, the beacon signal 165 is not impacted by jamming of GPS signals.

Figure 2:
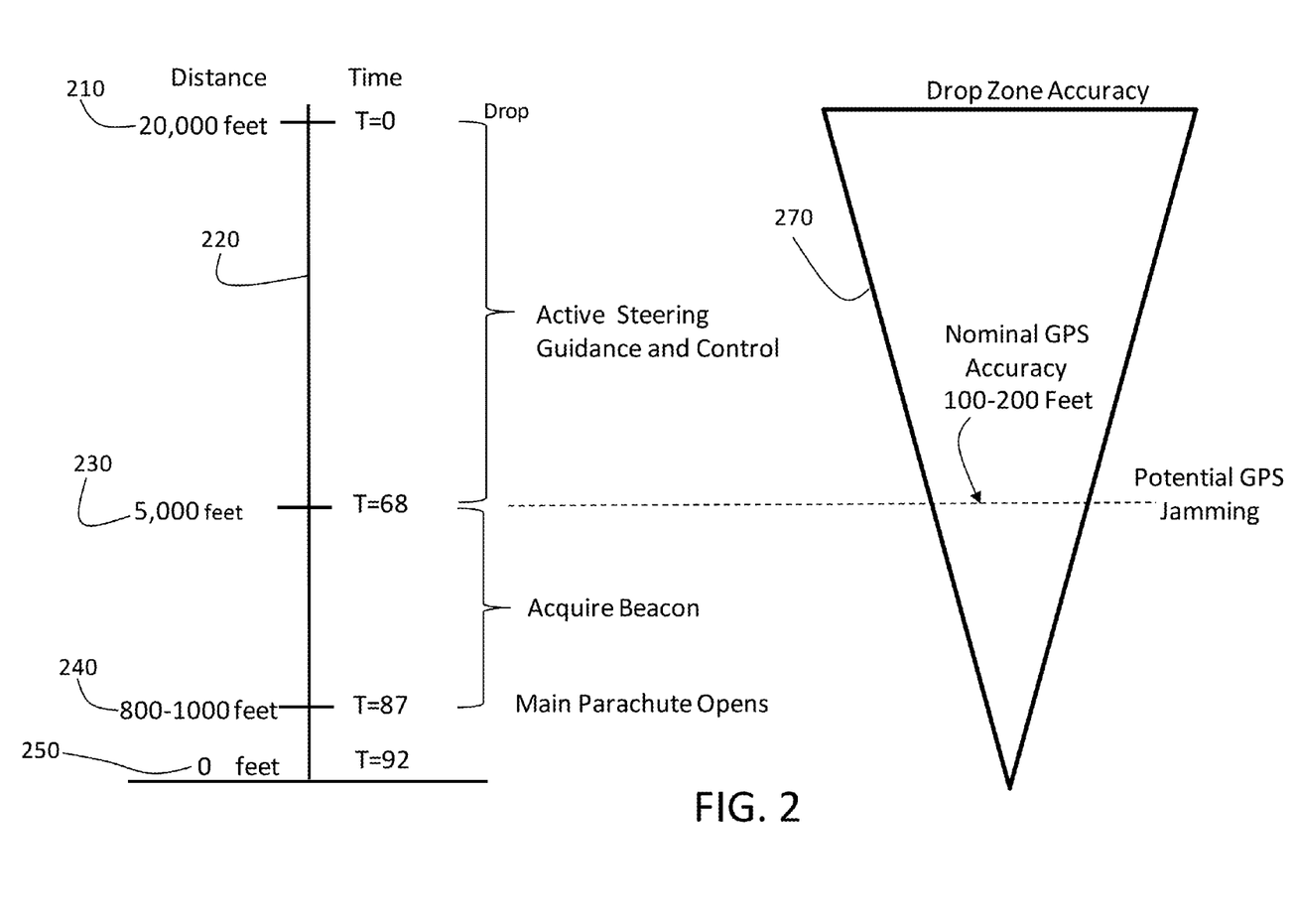
FIG. 2 illustrates a distance/time-line chart showing when certain operational actions occur with respect to elevation according to one embodiment disclosed herein.

Turning to FIG. 2, a distance/time-line 220 is used to illustrate the relative role of the above components during free-fall of the CDS bundle 115. At 20,000 feet 210, the CDS bundle 115 is dropped from the aircraft. This corresponds to time t=0. Other drop heights can be used. The drogue parachute 110 is deployed shortly after leaving the aircraft, and ensures that the bottom of the pallet 130 is generally pointing down to the ground during free fall. The CDS bundle 115 may be actively guided and controlled by a GPS/INS (INS alone if GPS is being jammed) based steering system from the height of deployment to a level of approximately 5,000 feet 230, which is approximately 68 seconds after leaving the aircraft. These times are approximated, and vary on a number of factors, but do not alter the application of the concepts herein.

At this point during descent, the sensor 151 in the beacon receiving system 150 is used to acquire the beacon signal 165. Once the beacon signal is acquired at around 5000 feet, the beacon receiving system 150 provides information used to control the steering system on the CDS bundle 115.

Shortly after this point, the main parachute(s) is opened. In one embodiment, the main parachute may open up at around 800-1000 feet 240 above the ground, which occurs at about t=87 seconds. The main parachute slows the rate of descent from approximately 150 knots to 20-30 feet per second. In other embodiments, the main parachutes may deploy at other altitudes, such as at 600-800 feet. Then, impact occurs at approximately 92 seconds after the initial drop from the aircraft.

The drop zone accuracy FIG. 270 is positioned adjacent to the distance/time-line 210 to illustrate how the accuracy of targeting the target drop location increases as the drop distance increases. At approximately 5000 feet, GPS signals can be potentially jammed, and it is around this altitude that the sensor 151 may be able to acquire the beacon signal 165. Based on the relative strength of the beacon signal and weather conditions, the beacon signal may be acquired at higher or lower altitudes. This can be adjusted or designed as appropriate for the applications. For example, when dropping relief supplies to forest fighters battling a fire, the presence of smoke in the atmosphere may decrease the altitude at which the beacon is acquired. In other applications, such as during a nighttime airdrop during clear atmospheric conditions, the beacon may be acquired at a higher altitude.

In some embodiments, the beacon receiving system 150 may be triggered to begin acquiring the beacon signal at a certain altitude. This can be accomplished by using an altitude sensor, GPS sensor, or estimated by a timer set for a known altitude and started once the CDS bundle is deployed from the aircraft.

Figure 3A:
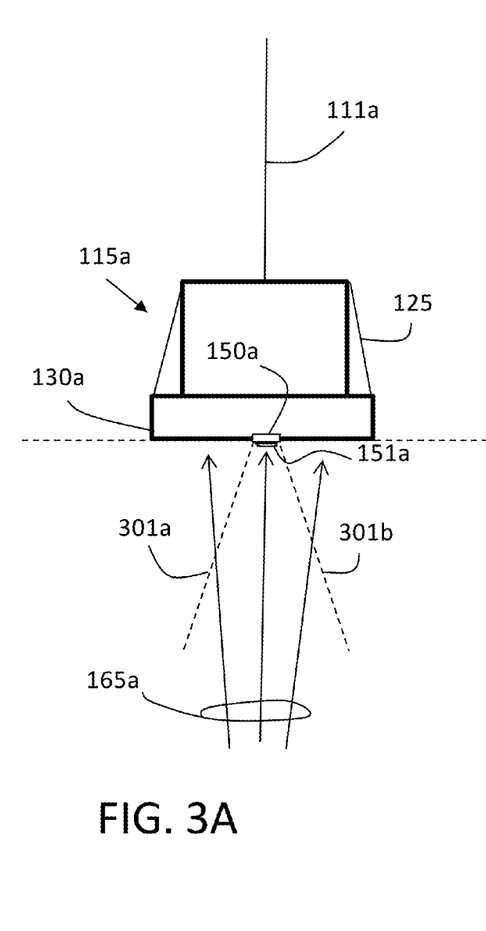
FIGS. 3A and 3B illustrate the field of view of a beacon receiving system according to one embodiment disclosed herein.

Turning now to FIG. 3A, a side view of the CDS bundle 115*a* is shown with the pallet 130*a* in a largely horizontal position. The drogue parachute 110 (not shown) produces drag that pulls the tether 111*a* so that the pallet 130*a* faces down. The beacon receiving system 150*a* comprises the sensor 151*a* with a line of sight downward. The sensor 151*a* receives the beacon signal 165*a* emanating up from the ground. Typically, the beacon receiving system 150*a* is integrated into the pallet. Integration can occur by drilling a hole into the pallet and inserting the sensor, which in one embodiment can be smaller than ¾" in diameter. Thus, the illustration of the sensor 151*a* is not shown to scale in FIG. 3A. The field of view ("FOV") 301*a*, 301*b* of the sensor 150*a* is shown as two dotted lines. In one embodiment, the FOV 301*a*, 301*b* is approximately 24°. This value is based on a typical maximum tilt 335 encountered by the CDS bundle 115*b*, as shown in FIG. 3B.

Figure 3B:
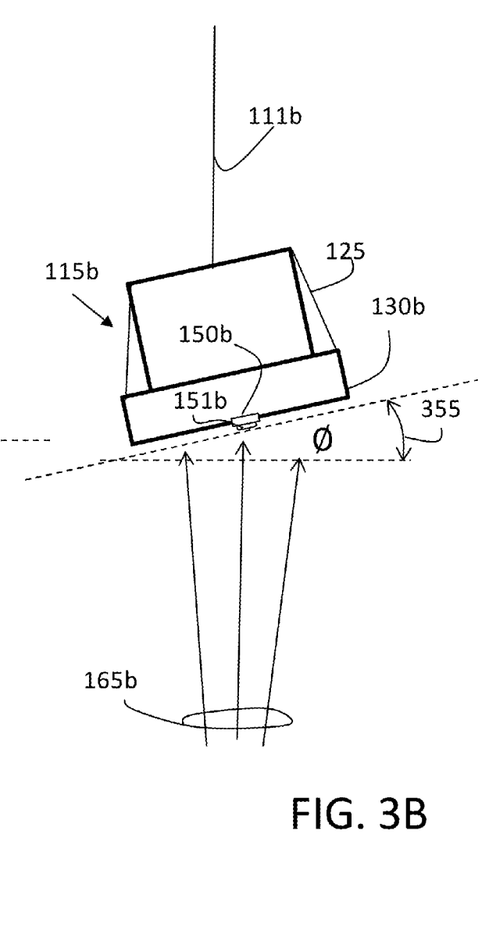

In FIG. 3B, the CDS bundle 115*b* is tilted by an amount denoted by angle $\theta$ 355. Typically, the pallet is buffeted by air as it free-falls, and rocks back and forth with a maximum angle of approximately 12°. The tether 111*b* of the drogue parachute 110 serves to pull the CDS bundle back to level so that the pallet 130*b* does not exceed this tilt. Thus, in one embodiment, the maximum field of view required by the sensor would be twice the maximum tilt, or 24°. The sensor's field of view accommodates the maximum possible tilt of the pallet allowing the sensor to continuously acquire the signal beacon without interruption.

Figure 4:
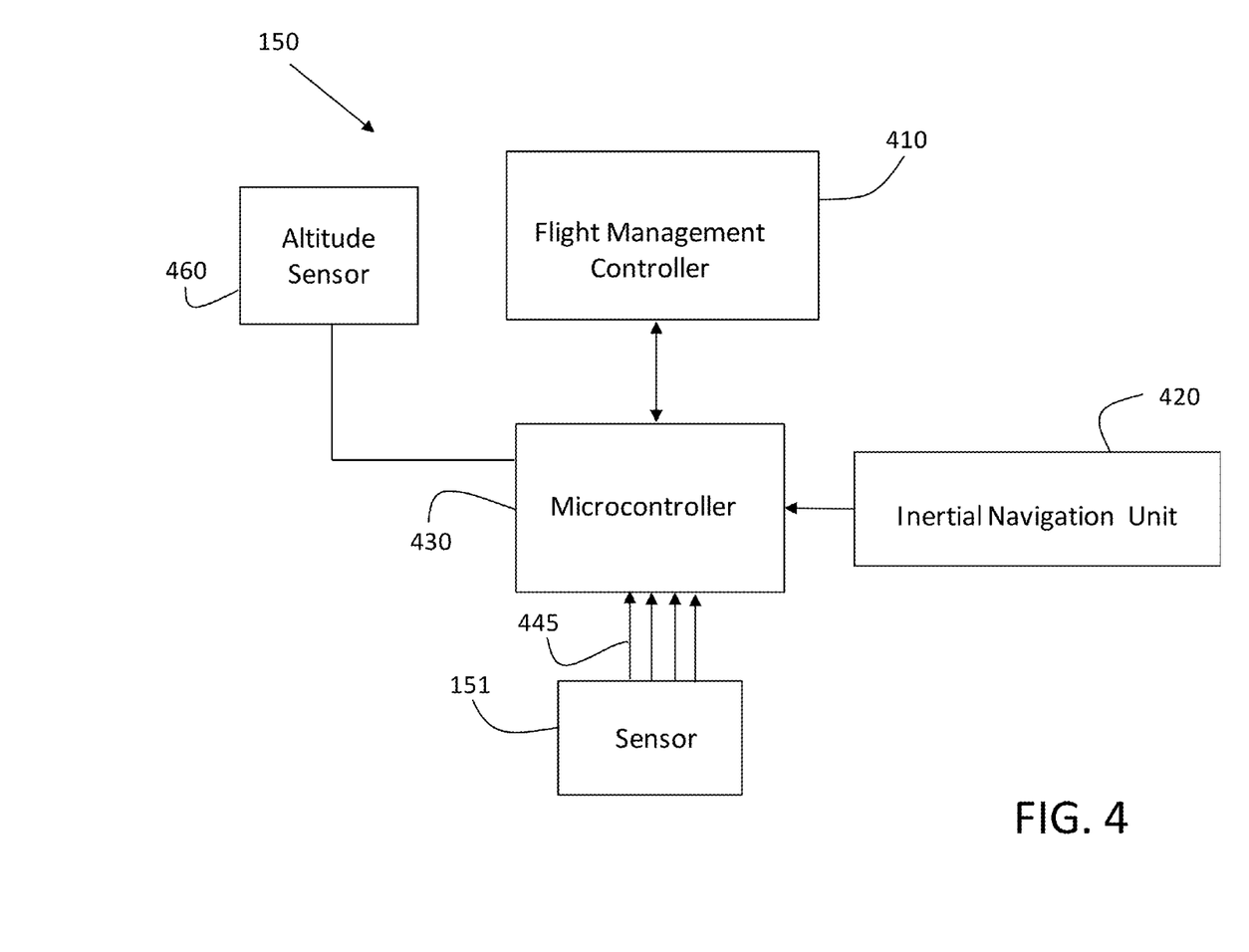
FIG. 4 illustrates components in one embodiment of a beacon receiving system according to one embodiment disclosed herein.

FIG. 4 illustrates one embodiment of the beacon receiving system 150 incorporated into the pallet 130. The beacon receiving system 150 may comprise an altitude sensor 460, which can be used to indicate at what point the beacon signal acquisition process should be initiated.

The beacon receiving system 150 comprises a sensor 151 which can be one of various electromagnetic sensors, such as an optical CCD sensor, quad sensor, infrared sensor, or other type of sensor known in the art. In one embodiment, the sensor can be a sensor commonly used in consumer electronics digital imaging applications (e.g., digital cameras). The sensor 151 in the embodiment shown in FIG. 4 may also be a type known as a quad sensor. A quad sensor has four quadrants, each configured to receive the beacon signal 165 and provide a corresponding output signal 445. The output signals 445 are received by a microcontroller that analyzes the output signals 445 in conjunction with signals from an inertial measurement unit 420.

The inertial measurement unit ("IMU") 420 is able to detect the tilt of the pallet 130 with respect to ground. This includes front-to-back and side-to-side tilt, and this is typically referred to as tilt in the X-Y directions. Either direction (front-to-back or side-to-side) can be allocated to the X direction or the Y direction. Unlike the tilt of the pallet 130 shown in FIG. 3B that is shown as having tilt in only one direction, the tilt of the pallet 130 during free fall usually has some degree of tilt in two directions. The microcontroller 430 receives the current X-Y tilt values from the IMU 420, and uses these values to adjust the signals 445 from the quad sensor to determine the relative tilt of the pallet to the beacon signal.

The microcontroller 430 is a processing unit coupled with memory and/or input controllers. In certain embodiments, the microcontroller can incorporate digital signal processing capabilities. In other embodiments, distinct processor circuits can be coupled with distinct memory circuits and/or input controllers to effect the microcontroller 430.

The relative tilt of the pallet 130 to the beacon signal 165 can be explained by returning back to FIG. 3A and FIG. 3B. In FIG. 3A, the CDS bundle 115a descending is directly over the beacon 165a. Assume for the moment, that the CDS bundle 115a is falling straight downwards, without any lateral movement. The angle of the beacon signal 165 as detected by the sensor 151 is perpendicular to the pallet. Thus, the angle is essentially zero degree off of perpendicular—e.g., the angle is perpendicular. Since the pallet is level and descending straight down, it would drop directly on the beacon, e.g., the intended drop location.

In FIG. 3B, it can be assumed that the CDS bundle 115b also is falling straight down, but the pallet 130b is tilted θ degrees, so the received beacon signal 165b will be θ degrees off of perpendicular. The IMU 420 provides information to the microcontroller indicating that the pallet is tilted at θ degrees, so the microcontroller knows that the current tilt of the pallet is the same as the tilt of the received beacon signal 165. Thus, at a given instant, the IMU 420 provides information to the microcontroller compensating for the buffeting motion of the CDS bundle 115 as it descends, and the microcontroller can ascertain a compensated value of the tilt of the beacon signal. Although this illustrates a single dimension, the concept can be extended to a two-dimensional tilt, namely in an X direction and a Y direction. The relative angle of the beacon signal after compensation is referred to herein as the offset angle.

If however, the CDS bundle is descending off course, e.g., to the side of the beacon, then the sensor 151 would receive the beacon signal 165 at an angle. The greater the angle, the greater the CDS bundle is off course. Of course, the current tilt of the pallet 130 would have to be taken into account to determine the offset angle. Using the angle of the beacon signal without compensating for the angle of the pallet 130 could potentially result in an erroneous indication of the CDS bundle's current course relative to the target drop location.

Returning to FIG. 4, in the embodiment shown, the microcontroller can provide the offset angle of the beacon signal to the flight management controller 410 that can steer the CDS bundle as appropriate to the beacon. Determining the correct steering direction comprises an algorithm that constantly attempts to minimize the offset angle. Steering the CDS bundle to be positioned over the beacon signal will reduce the offset angle. The direction can be computed and acted up in the X and Y direction as needed. In other embodiments, the microcontroller itself can directly instruct the flight management controller to steer the cargo in the appropriate direction. Steering the CDS bundle is accomplished by adjusting the fins 135a, 135b as required.

Figure 5:
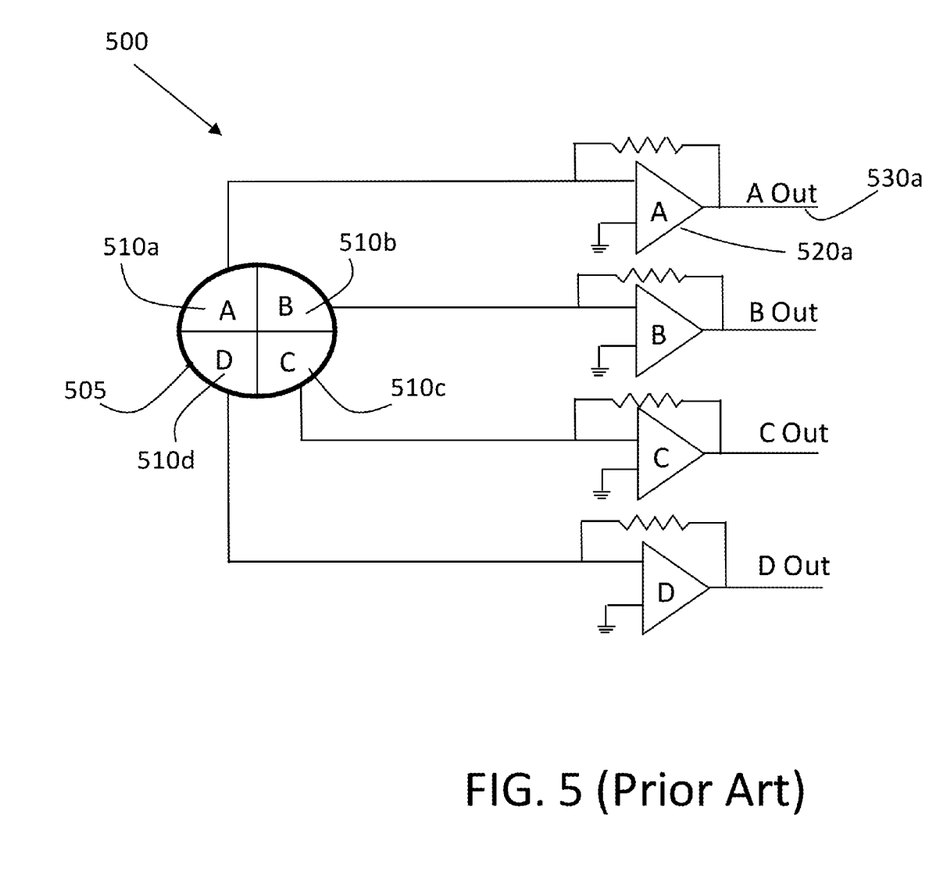
FIG. 5 illustrates a prior art quad sensor receiver.

The determination of which direction to steer the platform may be facilitated by using the aforementioned quad sensor, which is depicted in FIG. 5. FIG. 5 is an illustration of a prior art quad sensor receiver 500. The quad sensor 505 has a similar in structure to a photocell in that it is capable of detecting a wavelength of light, typically in the visible wavelength spectrum, although other frequencies such as infrared or ultraviolet can be used. Unlike a photocell, the quad sensor has four quadrants. Each quadrant 510a, 510b, 510c, and 510d is a separate detector configured to detect the beacon signal 165, and each detector outputs a signal to a respective separate operational amplifier. For example, quadrant A 510a is connected to an operational amplifier 520a, which generates a signal "A Out" 530a. The other quadrants are similarly connected. Thus, four output signals are provided, and the relative strength of the output signals can be processed to determine an angle of the beacon signal 165.

A centered or perpendicular beacon signal relative to the sensor would result in all four output signals to be of equal value. If the beacon signal were detected at an angle, then the output signals would be different, based on the detected angle. Typically, two opposite detectors (e.g., detector A 510a and detector C 510c) are used for determining the tilt in the X direction, and the other two are used for determining the tile in the Y direction.

The nature of the beacon signal used and detected by the quad signal sensor 505 can vary based on the application of the airdrop. In non-military applications, the visibility of the beacon signal to the naked eye (e.g., by enemy combatants) may not be an important consideration. Thus, the beacon signal may comprise visible light, which is relatively easy for the sensor to detect for night time airdrops. However, in some applications there may be a number of visible light beams in the vicinity of the drop zone that could be misinterpreted by the beacon receiving system 150 as the beacon signal. In such situations, the beacon receiving system 150 should not acquire an incorrect beacon signal; otherwise, the CDS bundle will be directed to an incorrect drop location.

To ensure that the correct light source is acquired as the beacon signal, the beacon signal may be "chopped" or pulsed to distinguish it from other light sources. This refers to periodically interrupting the beacon signal 165 mechanically or electrically. In other applications, the presence of another light source is unlikely, and locking onto an incorrect beacon signal is not a concern that warranting pulsing the beacon signal. In applications where pulsing the beacon signal is desired, FIGS. 6A and 6B illustrate two embodiments for respectively mechanically and electrically chopping the beacon signal.

Figure 6A:
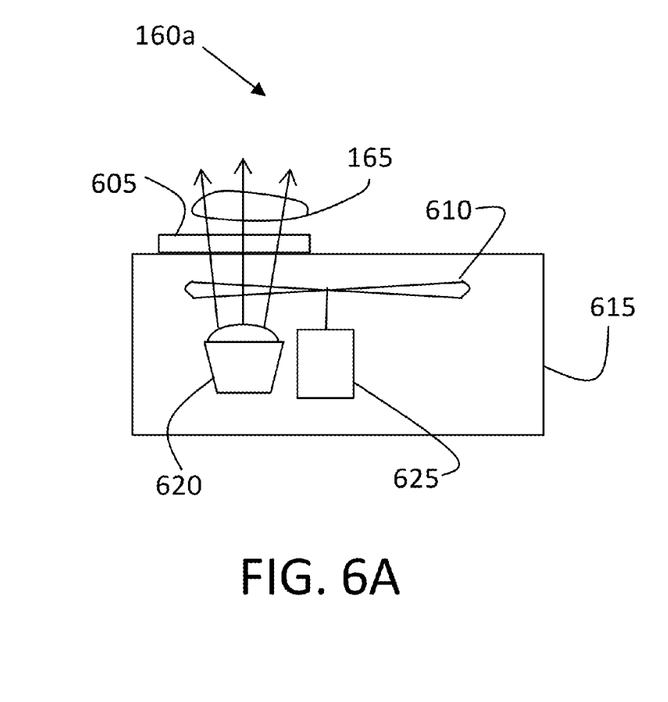
FIGS. 6A-6B illustrate two embodiments of beacon signal generators according to embodiments disclosed herein.

In FIG. 6A, the beacon 160a is shown as comprising an enclosure 615 that houses a light source 620 generating the beacon signal 165 through a lens 605. The lens provides a desired cone of dispersion of the beacon signal 165 to ensure that the energy of the beacon signal 165 is not so widely dispersed so as to be ineffective, nor so focused that it cannot be detected by the sensor 151. Adjacent to the beacon signal source 620 is a motor 625 which rotates a shutter 610. The shutter could be, in one embodiment, a fan blade. The shutter 610 intermittently interrupts the beacon signal, providing the chopped beacon signal. The rate of interruption must be correlated between the beacon 160a and the beacon receiving system 150. In one embodiment, the beacon can be chopped at a frequency of 1000 Hz, although other frequencies could be used. The beacon receiving system would recognize the particular light frequency as the correct beacon signal. This would also make it difficult to "spoof" or forge a beacon signal should there be an attempt to misdirect the drop location of the CDS bundle. In order to forge a beacon signal, the proper frequency would have to be used.

Figure 6B:
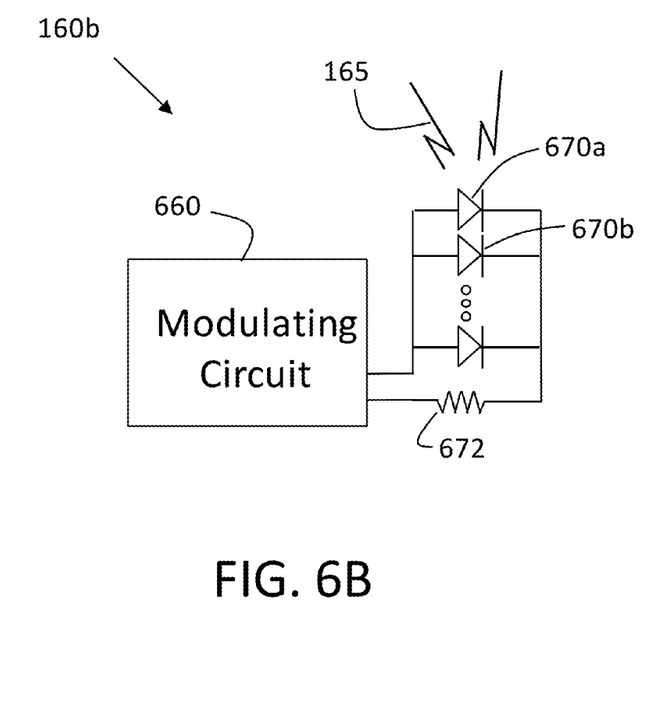

Another embodiment of an intermittent light source is illustrated in FIG. 6B. In this figure the beacon 160b comprises a modulating circuit 660 that intermittently provides power to a series of high power LEDs 670 for generating the beacon signal 165. A current limiting resistor 672 ensures that the LEDs are not over-driven. The modulating circuit 660 can comprise well known timing circuitry for generating a pulse width modulated signal to turn the LEDs ON and OFF at the desired frequency and duty cycle. Other components, such as a power source, are required, but are not shown.

The use of non-visible light for the beacon signal may be useful for military applications, where the airdrop occurs in a militarized zone. Any visible light directed upwards as a beacon signal, particularly at night, could be potentially viewed by enemy forces and used as a target. For such applications, a beacon signal wavelength that is not readily visible to the naked eye may be used. This would include use of ultra-violet and infrared electromagnetic spectrum wavelengths. Infrared wavelengths would be easier to detect by the sensor 151 in cloudy or overcast conditions.

Figure 7:
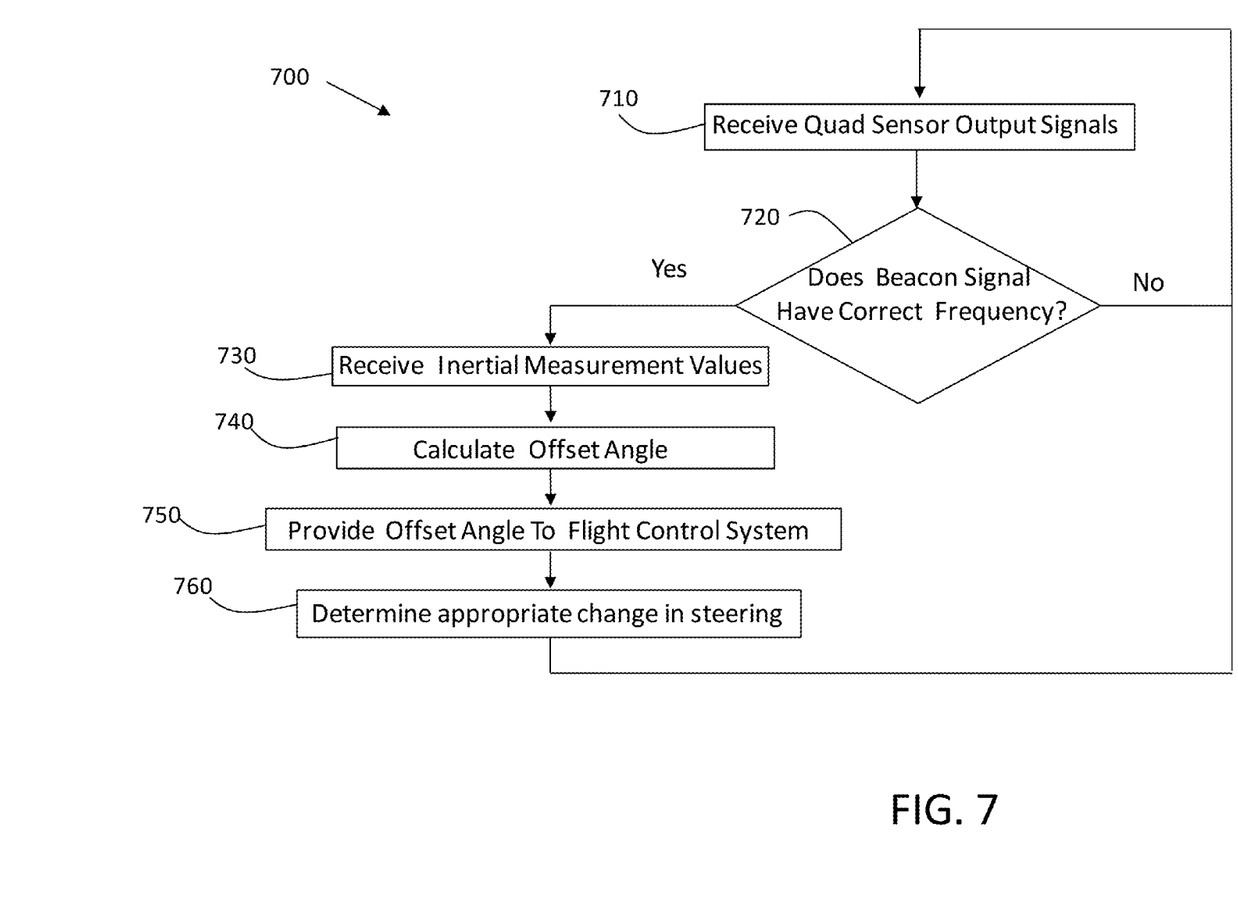
FIG. 7 illustrates one process flow of the beacon receiving system according to one embodiment disclosed herein.

The process employed by the beacon receiving system 150 of FIG. 4 can be illustrated by the process flow 700 in FIG. 7. In this embodiment, the process flow 700 is a continuous loop that monitors and adjusts the descent of the CDS bundle. The process flow may be actuated upon deployment, or it may be actuated once an altitude of 5000 feet is detected. Regardless of how the process 700 is triggered, the process continuously receives the output signals 445 from the quad sensor 440 in operation 710, which comprises four output signals. Two of the output signals original from two detectors corresponding to the X direction, and the other two output signals originate from the other two detectors corresponding to the Y direction. Together, these output signals indicate the angle at which the beacon signal is received by the beacon receiving system 150.

In operation 720, a frequency of the beacon signal is determined and compared against an expected value. If the signal does not have the expected frequency, then the process 700 returns to operation 710. Other embodiments may use frequency and/or duty cycle of the beacon signal 165. Other embodiments may use a more sophisticated coding technique to verify the authenticity of the beacon signal 165. These codes could be unique so that a series of CDS bundles airdropped simultaneously could be individually directed to separate drop locations by separate beacons employing unique beacon signals.

Assuming the beacon signal frequency is as expected, then in operation 730 the inertial measurement values are obtained from the IMU 420. The values from the IMU 420 indicate the relative tilt of the pallet 130 in X and Y direction. This information is used to compensate for the tilt of the beacon signal 165 as detected by the sensor 151. Using these values, an offset angle can be determined by the microcontroller in operation 740 to ascertain the tilt of the beacon as compensated with the tilt of the pallet. Once this offset angle is known, the offset angle can be provided to the flight management controller 410 in operation 750. In operation 760, the appropriate adjustments to the steering can be provided by the flight management controller 410.

Altering the steering of the CDS bundle during descent will alter the angle at which the beacon signal 165 is received by the sensor 151. Because the process 700 continuously operates, the process repeats operation 710 of receiving the beacon signal based on the current CDS bundle orientation. In this manner, the sensor 151 continuously receives the beacon signal 165, and the beacon receiving system 150 compares values indicating a received tilt with values indicating the current tilt of the pallet 130 to ascertain the offset angle of the beacon signal. Thus, the flight management controller constantly adjusts the steering accordingly.

If GPS signals are not jammed and available for navigation, these signals can be used by the flight management controller to verify the current position of the CDS bundle, and to further refine the steering control adjustments as necessary.

The architecture of the beacon receiving system shown in FIG. 4 may be embodied in various forms. In another embodiment, the processing of the microcontroller 430 may be integrated with the processing performed by the flight management controller 410. A GPS receiver may also provide inputs to the microcontroller, as well as the flight management controller. The microcontroller may be embodied as a processor operating in combination with discrete memory and/or input control circuits. Other processing structures, including programmable logic arrays ("PLAs") or digital signal processing circuits may be used.

Those skilled in the art will recognize that the concepts and technology presented herein can be embodied in various ways. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A system for targeting airdropped cargo delivery comprising:
   a sensor configured to be integrated into a pallet of a container delivery system ("CDS") bundle, wherein the sensor is able to detect a beacon signal of a specified electromagnetic wavelength spectrum directed in an upward direction from ground, said sensor further configured to generate a first set of reference signals associated with the beacon signal;
   an inertial reference unit configured to be integrated into the pallet and generate a second set of reference signals corresponding to a tilt of the pallet;
   a microcontroller configured to
      receive the first set of reference signals,
      receive the second set of reference signals, and
      use the first set of reference signals and the second set of reference signals to ascertain an offset angle of the beacon signal, and
      provide the offset angle for steering the pallet to the beacon signal; and
   a beacon signal generator, configured to be placed at a drop location and generate the beacon signal of the specified electromagnetic wavelength spectrum.

2. The system of claim 1, wherein the electromagnetic wavelength spectrum comprises a visible wavelength spectrum.

3. The system of claim 1, wherein the inertial reference unit provides the second set of reference signals comprising a two orthogonal values representing a corresponding tilt of the pallet in an X and Y direction.

4. The system of claim 3, wherein the sensor provides the first set of reference signals comprising two orthogonal values representing corresponding angles of the beacon relative to the pallet in the X and Y direction.

5. The system of claim 3, wherein the sensor is a quadrant sensor and the first set of reference signals comprises four signals.

6. The system of claim 1, wherein the beacon signal generator comprises a plurality of LEDS and a modulator for generating the beacon signal with a periodic duty cycle.

7. The system of claim 1, further comprising an altitude sensor wherein the processor is configured to ascertain the relative angle of the beacon signal below a threshold altitude.

8. The system of claim 1, wherein the beacon signal is a pulsed beacon signal with a frequency, and the processor is configured to detect the pulsed beacon signal at the frequency.

9. A system comprising:
   a sensor configured to be integrated with a pallet of a container delivery system ("CDS") bundle, wherein the sensor is able to detect a beacon signal of a specified electromagnetic wavelength spectrum directed in an upward direction from ground, said sensor further configured to generate a first set of reference signals;

an inertial reference unit configured to be integrated into the pallet configured to generate a second set of reference signals; and a microcontroller configured to receive the first set of reference signals and the second set of reference signals and ascertain an offset angle of the beacon signal, wherein the microcontroller is configured to generate data used to adjust steering of the CDS bundle during descent.

10. The system of claim 9, further comprising:
the pallet, into which the sensor and the inertial reference unit are integrated.

11. The system of claim 9, wherein the sensor comprises a quad sensor providing four output signals.

12. The system of claim 11, wherein the microcontroller is configured to receive the four output signals from the sensor.

13. The system of claim 9, wherein the specified electromagnetic wavelength spectrum comprises a visible electromagnetic wavelength.

14. The system of claim 9, wherein the sensor is configured to receive spectrum in an infrared electromagnetic wavelength.

15. A method for controlling the descent of an airdropped container delivery system ("CDS") bundle pallet comprising:

receiving a beacon signal emanating from the ground at a beacon sensor integrated into the CDS bundle pallet;

determining a tilt of a CDS bundle pallet from an inertial measurement unit;

determining an angle of the beacon signal as received by the beacon sensor; and determining an offset angle of the beacon signal from the tilt of the CDS bundle pallet and the angle of the beacon signal.

16. The method of claim 15, further comprising adjusting a direction of the CDS bundle pallet based in part on the offset angle.

17. The method of claim 16 wherein determining a tilt comprises determining tilt in two orthogonal directions.

18. The method of claim 17 wherein determining the angle of the beacon signal comprises determining the angle of the beacon signal in two orthogonal directions.

19. The method of claim 18, further comprising determining an altitude, and upon determining that the altitude is below a threshold performing the operation of determining the offset angle of the beacon signal.

20. The method of claim 15, wherein receiving the beacon signal from the beacon sensor comprises receiving four signals from a quadrant signal detector.

* * * * *